Figure 1:
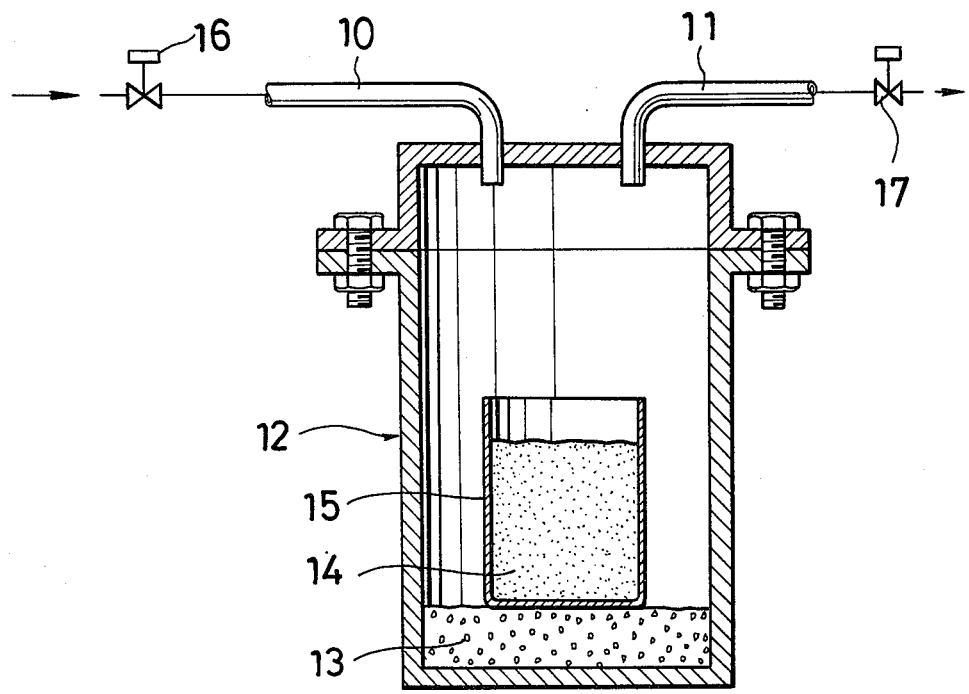

United States Patent [19]

Muramoto et al.

[11] 4,282,117
[45] Aug. 4, 1981

[54] METHOD FOR PRODUCING ELECTRICALLY CONDUCTIVE ZINC OXIDE

[75] Inventors: Makoto Muramoto; Nobuyuki Ishida; Fujio Matsushita, all of Neyagawa, Japan

[73] Assignee: The Honjo Chemical Corporation, Japan

[21] Appl. No.: 43,646

[22] Filed: May 30, 1979

[30] Foreign Application Priority Data

Jun. 12, 1978 [JP] Japan .................................. 53/71161
Jul. 11, 1978 [JP] Japan .................................. 53/84812

[51] Int. Cl.³ .............................................. H01B 1/06
[52] U.S. Cl. .................................. 252/508; 252/506; 252/518; 423/592
[58] Field of Search ...................... 252/508, 506, 578; 423/592

[56] References Cited

U.S. PATENT DOCUMENTS 3,515,686   6/1970   Bowman .............................. 252/518

Primary Examiner—J. L. Barr
Attorney, Agent, or Firm—Wenderoth, Lind & Ponack

[57] ABSTRACT

A method for producing electrically conductive zinc oxide comprising calcining zinc oxide under an ambient atmosphere in a vessel at a temperature from about 800° to about 1100° C. in a mixture thereof with aluminum oxide or a precursor thereof convertible into the oxide under the conditions of treatment in an amount of about 0.05 to about 5 moles based on aluminum atom therein in relation to 100 moles of zinc oxide in the presence of solid carbon. A further improvement in the method comprises mixing zinc oxide with aluminum oxide powder of not more than about 20 millimicrons in average particle size in the dry form to provide a feed mixture, and calcining the mixture, to provide a highly conductive form of zinc oxide.

8 Claims, 2 Drawing Figures

METHOD FOR PRODUCING ELECTRICALLY CONDUCTIVE ZINC OXIDE

The present invention relates to a method for producing electrically conductive zinc oxide. More particularly, it relates to an improvement in a conventional method for converting non-conductive zinc oxide to a conductive form.

Electrically conductive zinc oxide is now, for example, in a wide use as a coating in the production of electrophotographic paper for facsimile. There have been proposed a variety of methods for producing electrically conductive zinc oxide. According to a typical method, as is disclosed in U.S. Pat. No. 3,538,022 to Bowman, zinc oxide is heated to a temperature of from about 600° C. to about 900° C. in a reducing gas atmosphere in an admixture with an oxide of aluminum, gallium or indium as an activating agent. U.S. Pat. No. 3,538,023 also to Bowman discloses a method similar to the above for converting non-conductive zinc oxide to a conductive form, in which an oxide of germanium or tin is used an activating agent.

In these previously developed methods, hydrogen or carbon monoxide is used as a reducing gas, which is, however, explosive. Thus, in the commercial application of the methods, the reducing gas should be mixed with an inert gas, for example, nitrogen, to make up a non-explosive reducing atmosphere under the conditions of heat treatment. This requires complicated and expensive additional equipment, and results in a high production cost.

Furthermore, these prior methods do not provide zinc oxide of a sufficiently high conductivity for practical use when aluminum oxide or a precursor thereof is used as an activation agent readily available at a lower cost than other oxides such as gallium and indium oxides.

It is, therefore, an object of the present invention to provide an improved method for producing electrically conductive zinc oxide.

It is a further object of the invention to provide a method for converting zinc oxide to a form of a higher conductivity by the use of aluminum oxide or a precursor thereof as an activating agent.

It is also an object of the present invention to provide an improved method for producing electrically conductive zinc oxide which permits the use of an admixture of zinc oxide and aluminum oxide powder in the dry form to provide highly conductive zinc oxide.

A method for producing electrically conductive zinc oxide according to the invention comprises calcining zinc oxide to a temperature of from about 800° C. to about 1100° C. in an admixture with aluminum oxide or a precursor thereof convertible into the oxide under the conditions of treatment in an amount of about 0.05 moles to about 5 moles based on aluminum atom therein in relation to 100 moles of zinc oxide in the presence of solid carbon.

Figure 2:
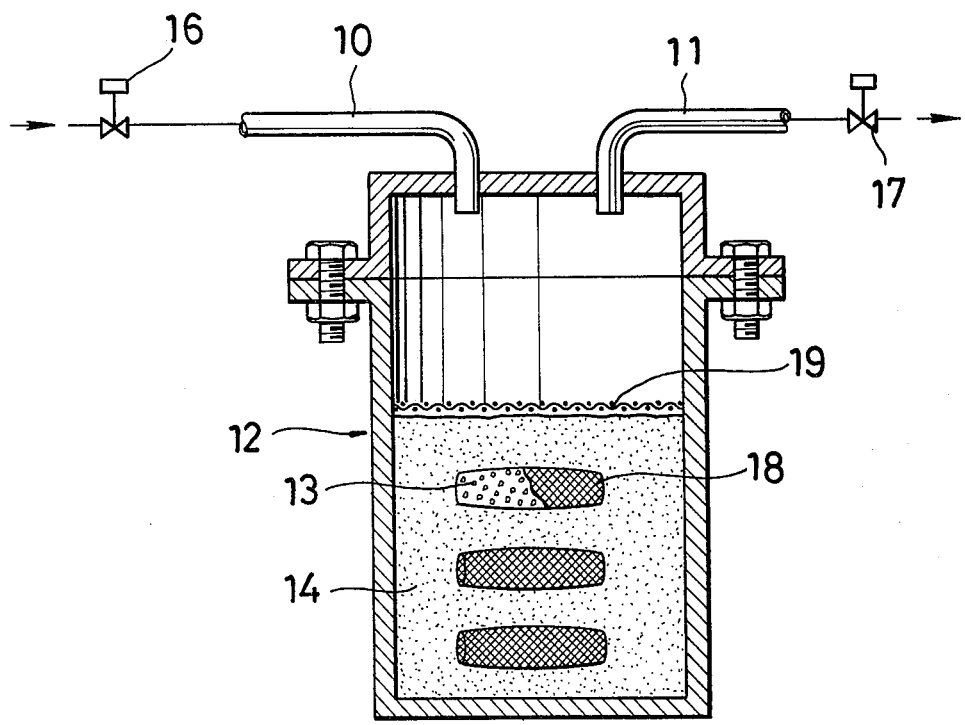

Other objects and features of the invention will be apparent from the following description and the accompanying drawings, in which:

FIG. 1 illustrates an embodiment of the method according to the invention in conjunction with an apparatus in section used for carrying out the method; and, FIG. 2 illustrates another embodiment of the method of the invention.

In the method of the invention, aluminum oxide or a precursor thereof convertible into the oxide under the conditions of treatment is used as an activating agent for converting zinc oxide to a conductive form. The precursor therefore, includes aluminum hydroxide, halides such as aluminum chloride and bromide, inorganic acid salts of aluminum such as nitrate and sulfate, organic acid salts of aluminum such as formate and acetate, and the like. Aluminum oxide and the precursors thereof are used individually or as a mixture thereof.

The activating agent is mixed with zinc oxide to provide a feed mixture. The activating agent is used in such an amount that the feed mixture contains from about 0.05 moles to about 5 moles of aluminum atom therein per 100 moles of zinc oxide. Preferably, the amount of the activating agent used ranges from about 0.5 moles to about 3 moles based on aluminum atom therein in relation to 100 moles of zinc oxide. When the amount of the activating agent is in the above range, electrically conductive zinc oxide of resistivity of the order of from $10^0$ to $10^3$ ohm cm is obtained, and according to preferable embodiments, zinc oxide obtained has a resistivity of from $10^0$ to $10^1$ ohm cm. On the other hand, when the amount of the activating agent is outside the above range, zinc oxide obtained has usually a resistivity more than $10^4$ ohm cm, too large for practical uses.

The activating agent is usually added in an aqueous solution or a suspension thereof to zinc oxide powder, and then thoroughly mixed into a uniform paste or slurry. The content of the activating agent in the solution or suspension is not specifically limited herein in the invention. It is enough that the content is selected so as to provide a uniform feed mixture in the form of paste or slurry easy to handle, provided that the feed mixture contains from about 0.05 to about 5 moles of aluminum atom per 100 moles of zinc oxide. As an example, 100 parts by weight of zinc oxide powder is mixed with from about 70 to about 100 parts by weight of solution or suspension of the activating agent.

The thus obtained feed stock is preferably dried preliminarily at a temperature of about 100°–120° C. for several to several tens of hours in air to remove the water therein, and then further dried at a temperature of about 500°–700° C. either in an ambient or a nitrogen atmosphere for several tens of minutes to several hours prior to the calcination. The dried mixture is pulverized, and then heated under an ambient atmosphere, i.e., the air atmosphere, to a temperature of about 800°–1100° C. usually for from 15 minutes to about 3 hours. When the calcination is carried out at a temperature below about 800° C., the product has an insufficient conductivity, and at a temperature higher than about 1100° C., zinc oxide is liable to be reduced into metal zinc during the calcination. The thus obtained product, although having a sufficiently large electrical conductivity, is contaminated with metal zinc, and therefore is not suitable for use as a coating for electrophotographic paper.

The term "solid carbon" used herein means carbon in the form of powder, grain, and lump or mass, and any one of these forms is suitably used in the invention. The solid carbon includes charcoal and coal in the form of either powder, granular or mass. In use of the solid carbon, it is placed in a calcining vessel together with the feed mixture in an amount sufficient for producing a reducing atmosphere in the vessel under the conditions of calcination. The solid carbon can be mixed with the feed stock. That is, the solid carbon can be either uniformly dispersed in or non-uniformly placed in a layer of the feed stock. Also, the carbon can be placed in the vessel separately from the feed stock. When mixed with the feed mixture, the solid carbon is preferably of powder or granule, and after the calcination, the residual carbon, if any, is filtered off from the calcined product. When the powder carbon of very fine particle size is used in such an amount that all the carbon is converted into carbon oxides during and under the conditions of calcination, however, there is no need of filtration of the carbon since the fine powder carbon is readily and completely reduced into the oxides thereof.

In another embodiment, the solid carbon can be placed in the vessel to form a layer. The feed mixture is then placed thereupon in contact therewith in a second layer, or is in advance put in a container, e.g., a crucible, and then placed upon the carbon layer. In a further embodiment, the solid carbon such as granular and lump coal is wrapped in a wire mesh, which is in turn buried in a layer of the feed stock in the vessel. Any porous container can be used for wrapping the carbon if the container permits the gaseous product from the carbon to pass therethrough, but not the solid carbon.

The above described method according to the invention has an advantage in that there is no need of introducing a reducing gas such as hydrogen into the calcination vessel during the calcination since the solid carbon reacts with oxygen in an ambient atmosphere under which the calcination is started, thereby producing a reducing gas, i.e., carbon monoxide. The thus formed reducing gas, however, is preferably allowed to be discharged naturally from the calcination vessel as the gas is generated so as to keep the reducing atmosphere in the vessel at a substantially constant pressure.

After the calcination, the thus calcined product in the vessel is cooled preferably under a non-oxidizing atmosphere to a temperature lower than about 200° C., most preferably to room temperature. For example, when the calcination is completed, the vessel is closed to separate the calcined product from the outside atmosphere, and then is allowed to cool. More preferably, when the calcination is completed, the calcined product is permitted to stand and is cooled with an inert gas such as nitrogen and argon continuously passed through the vessel. It is likely that the cooling of the calcined product under an oxidizing atmosphere results in a smaller conductivity of the product obtained.

The above described method of the invention has various advantages over the prior methods in both technical and economical respects. As is previously stated, it is not required in the method that a reducing gas be introduced into the calcination vessel on calcining the feed mixture. Thus, it is a great advantage that in the application to commercial production of conductive form of zinc oxide, the method of the invention requires no additional equipment and operations for making up a reducing atmosphere in the vessel when calcining. Furthermore, the method of the invention provides highly electrically conductive zinc oxide by the use of aluminum oxide or a precursor thereof as the activating agent.

In both the prior methods and the above described method of the invention, however, zinc oxide is mixed with a solution or a suspension of the activating agent to form a paste or slurry, dried, and then powdered for calcining. On drying, the mixture agglomerates, and therefore should be powdered. On calcining, too, the mixture usually agglomerates to form grains of a relatively large particle size, or lumps, which also should be powdered so as to be suitable for practical uses. To the inventors' knowledge, there has been proposed no method which provides highly electrically conductive zinc oxide by the use of a mixture in the dry form of zinc oxide and the activating agent.

Therefore, according to the invention, there is provided a further improvement in a method for producing electrically conductive zinc oxide. The improvement comprises the use of aluminum oxide powder of not more than about 20 millimicrons in average particle size mixed in the dry form with zinc oxide powder. The effective amount of the aluminum oxide powder is from about 0.05 moles to about 5 moles, preferably about 0.5 moles to about 5 moles, based on aluminum atom therein in relation to 100 moles of zinc oxide. Aluminum oxide powder much larger than about 20 millimicrons in average particle size is not suitable for use in the present invention since the dry mixture thereof with zinc oxide powder fails to provide highly electrically conductive zinc oxide. The use of aluminum oxide in an amount outside the above range, on the other hand, is liable to cause the agglomeration of the feed mixture during the calcination as well as a lowering of the conductivity of the calcined product.

The dry mixing of zinc oxide with the aluminum oxide powder can be carried out by any conventional means such as a V-type, a ribbon-type, and a screw type mixers. The means is not specifically restricted herein as long as it provides a uniform mixture of the oxides.

The dry mixture thus obtained is treated in the presence of the solid carbon as is previously defined in the same manner as is previously stated. A preferred embodiment according to the method also provides zinc oxide of the order of $10^0$ to $10^1$ ohm cm in resistivity.

According to this improvement, it is usually unnecessary to powder the calcined product after the calcination since there occurs substantially no agglomeration of the mixture during the calcination. The calcined product obtained according to the method is usually of from about 1 to about 1.5 microns in average particle size, although somewhat dependent on calcining temperatures.

In the method of the invention where the feed mixture is either in the wet form or the dry form, either French or American process zinc oxide of the usual particle size can be used, size, that is, from about 0.1 to several microns, preferably from about 0.1 to about 2 microns.

Now referring to FIG. 1 illustrating an embodiment of the method of the invention, in which a heat-resistant stainless steel vessel 12 is used as the calcining vessel. The vessel has at the upper portion thereof a supply pipe 10 connected therewith for controllably introducing an inert gas such as nitrogen into the vessel through a supply valve 16 mounted on the pipe, and a discharge pipe 11 to allow the reducing gas to be discharged from the vessel spontaneously as it is generated during the calcination. The discharge pipe has a discharge valve 17 which is operated when necessary. On the bottom of the vessel is placed coarsely powdered charcoal 13 in a layer, and then thereupon is put a crucible 15 which contains the feed mixture 14. Either a wet-mixed, dried and powdered mixture, or a dry mixture can be used as the feed. The vessel is then put in an electric furnace (not shown), for example, in an ambient atmosphere, with the discharge valve opened whereas the supply valve closed, and is heated to calcine the feed mixture therein. The reducing gas generated from the charcoal is allowed to be spontaneously discharged through the discharge valve as the gas is generated. After calcining for a predetermined period of time, the supply valve is also opened to introduce nitrogen into the vessel to form an non-oxidizing atmosphere in the vessel, and the calcined product therein is stood for cooling.

FIG. 2 illustrates another embodiment of the method of the invention, in which the calcining vessel 12 has a stainless steel or iron inside and a heat resistant steel outside. In this embodiment, the feed mixture 14 is first placed in the vessel in a layer, and then coarsely powdered charcoal 13 wrapped in a wire mesh 18 is placed in the charcoal layer. If desired, a second wire mesh 19 is put on the feed mixture to cover thereof. The calcining and the subsequent cooling of the feed is carried out in the same manner as in the case of FIG. 1.

After cooling, the charcoal is removed from the calcined product, if necessary, and the product is powdered, if necessary, to provide conductive zinc oxide according to the invention.

The invention will be understood more readily with reference to the following examples; however, these examples are intended to illustrate the invention and not to be construed to limit the scope of the invention.

EXAMPLE 1

About 80 parts by weight of an aqueous solution of the activating agent were thoroughly mixed with 100 parts by weight of zinc oxide to form a paste. The paste was dried at a temperature of about 110° C. for 12 hours, powdered, further dried at a temperature of about 500°–700° C. for 1 hour, and then finely pulverized again, thereby providing a feed mixture containing various amounts of the activating agent as listed in the following tables.

As is shown in FIG. 1, 8 parts by weight of coarsely crushed charcoal were placed in a layer on the bottom of a calcining vessel, and a crucible was put thereupon which contained 30 parts by weight of the above feed mixture. Then, the heating was started under an ambient atmosphere for calcining the feed at temperatures listed in the tables for 30 minutes, while the reducing gaseous products were allowed to be spontaneously discharged from the vessel as they were generated. Under a nitrogen atmosphere the mixture was stood for cooling to a temperature of about 100° C., and then powdered. TABLES 1, 2, and 3 show the resistivity in ohm cm of the thus obtained conconductive zinc oxide when aluminum nitrate, $Al(NO_3)_3.9H_2O$, aluminum sulfate, $Al_2(SO_4)_3.18H_2O$, and aluminum chloride, $AlCl_3$, were used as the activating agent, respectively.

TABLE 4 shows the resistivity in ohm cm of the product when a suspension of aluminum oxide of about 20 millimicrons in average particle size was used for preparing the feed stock, which was treated in the same as above.

The measurement of resistivity was made on a pellet obtained by compressing the product in powder under 575 Kg/cm$^2$.

TABLE 1

| Aluminum nitrate | Calcining temperature (°C.) | | |
|---|---|---|---|
| (moles)* | 890 | 950 | 1000 |
| 0.05 | $3.2 \times 10^3$ | $3.2 \times 10^3$ | — |
| 0.1 | $4.4 \times 10^2$ | $1.7 \times 10^2$ | $5.3 \times 10^2$ |
| 0.5 | $4.3 \times 10^1$ | $3.3 \times 10^1$ | $4.9 \times 10^1$ |
| 1.0 | — | 9.8 | $3.8 \times 10^1$ |
| 3.0 | — | $6.1 \times 10^1$ | $6.7 \times 10^1$ |

TABLE 1-continued

| Aluminum nitrate | Calcining temperature (°C.) | | |
|---|---|---|---|
| (moles)* | 890 | 950 | 1000 |
| 5.0 | — | $1.2 \times 10^2$ | $1.2 \times 10^2$ |

*moles of a aluminum atom to 100 moles of zinc oxide.

TABLE 2

| Aluminum sulfate | Calcining temperature (°C.) | | |
|---|---|---|---|
| (moles)* | 850 | 950 | 1000 |
| 0.1 | $2.8 \times 10^2$ | $1.5 \times 10^2$ | $1.5 \times 10^2$ |
| 0.5 | $1.2 \times 10^2$ | $2.5 \times 10^1$ | $3.2 \times 10^1$ |
| 3.0 | $3.6 \times 10^2$ | $9.4 \times 10^1$ | $4.4 \times 10^1$ |

*moles of aluminum atom to 100 moles of zinc oxide.

TABLE 3

| Aluminum chloride | Calcining temperature (°C.) | | | | |
|---|---|---|---|---|---|
| (moles)* | 800 | 850 | 900 | 1000 | 1100 |
| 0.1 | — | $2.8 \times 10^3$ | $7.6 \times 10^2$ | $1.9 \times 10^1$ | $4.4 \times 10^2$ |
| 0.5 | $1.5 \times 10^3$ | $3.5 \times 10^2$ | $8.2 \times 10^1$ | $1.2 \times 10^1$ | $3.0 \times 10^1$ |
| 3.0 | $7.8 \times 10^2$ | $4.3 \times 10^2$ | $1.7 \times 10^2$ | $2.2 \times 10^1$ | $2.1 \times 10^1$ |

*moles of aluminum atom to 100 moles of zinc oxide.

TABLE 4

| Aluminum oxide | Calcining temperature (°C.) | | | |
|---|---|---|---|---|
| (moles)* | 800 | 900 | 1000 | 1100 |
| 0.5 | $6.8 \times 10^2$ | $1.5 \times 10^2$ | $4.7 \times 10^1$ | 7.4 |
| 1.0 | $1.9 \times 10^3$ | $7.0 \times 10^1$ | $2.8 \times 10^1$ | 7.1 |
| 3.0 | $2.8 \times 10^3$ | $1.6 \times 10^2$ | $2.7 \times 10^1$ | $1.3 \times 10^1$ |

*moles of aluminum to 100 moles of zinc oxide.

EXAMPLE 2

Zinc oxide of about 0.8 microns in average particle size was thoroughly mixed with aluminum oxide powder of about 20 millimicrons in average particle size, "Aluminum Oxide C" produced by Degussa, West Germany, and sold by Nihon Aerosil, Japan, by the use of a mixer, "Micro-speed Mixer" sold by Takara Koki, Japan, for 5 minutes, thus providing dry mixed feeds containing various amounts of aluminum oxide as listed in the following table.

As is shown in FIG. 2, 30 parts by weight of the feed mixture were first placed in a calcination vessel. Then, 8 parts by weight of coarsely powdered charcoal wrapped portionwise in wire meshes were placed in a layer of the feed. The heating was started under an ambient atmosphere, and the feed was calcined in the same manner as is described in connection with FIG. 1 at temperatures listed in the table for 1 hour. After the calcination, the mixture was stood for cooling to room temperature under a nitrogen atmosphere. The thus calcined zinc oxide mainly comprised particles of about 1.2 to about 1.4 microns in particle size. The resistivities of the product in ohm cm are listed in TABLE 4.

TABLE 4

| Aluminum oxide | Calcining temperature (°C.) | | | |
|---|---|---|---|---|
| (moles)* | 800 | 900 | 1000 | 1100 |
| 0.05 | — | — | $4.1 \times 10^4$ | — |
| 0.1 | — | — | $6.2 \times 10^2$ | — |
| 0.5 | — | — | $5.3 \times 10^1$ | — |
| 1.0 | $4.3 \times 10^2$ | $9.0 \times 10^1$ | $2.7 \times 10^1$ | 7.0 |
| 3.0 | — | — | $5.1 \times 10^1$ | — |

TABLE 4-continued

| Aluminum oxide | Calcining temperature (°C.) | | | |
| --- | --- | --- | --- | --- |
| (moles)* | 800 | 900 | 1000 | 1100 |
| 5.0 | — | — | $1.5 \times 10^2$ | — |

*moles of aluminum atom to 100 moles of zinc oxide.

REFERENCE EXAMPLE

Except for the use of aluminum oxide powder of about 9.9 microns in average particle size sold by Wako Junyaku Kogyo, Japan, in an amount of 1.0 mole of aluminum atom therein in relation to 100 moles of zinc oxide, a mixture thereof with zinc oxide in the dry form was treated in the same manner as in EXAMPLE 2, to provide a calcined product of $5.2 \times 10^6$ ohm cm in resistivity.

What is claimed is:

1. A method for producing electrically conductive zinc oxide comprising:
    calcining zinc oxide under an ambient atmosphere in a vessel at a temperature of about 800° C. to about 1100° C. in a mixture thereof with aluminum oxide or a precursor thereof convertible into the oxide under the conditions of treatment, the precursor being selected from the group consisting of aluminum nitrate, aluminum sulfate, aluminum chloride, aluminum bromide, aluminum hydroxide, aluminum formate and aluminum acetate, in an amount of from 0.5 moles to about 5 moles, based on the aluminum therein, in relation to 100 moles of zinc oxide, in the presence of solid carbon, while allowing the gases generated by the reaction of the solid carbon with the ambient atmosphere to be discharged spontaneously from the vessel as the gases are generated; and
    cooling the thus calcined mixture to a temperature below about 200° C. under a non-oxidizing atmosphere.

2. A method for producing electrically conductive zinc oxide as claimed in claim 1 further comprising:
    mixing zinc oxide with aluminum oxide or a precursor thereof in an aqueous solution or a suspension thereof;
    drying the resulting paste or slurry;
    pulverizing the mixture; and
    calcining the mixture.

3. A method for producing electrically conductive zinc oxide as claimed in claim 1 further comprising:
    mixing zinc oxide powder with aluminum oxide powder of not more than about 20 millimicrons in average particle size in the dry form; and
    calcining the mixture, 4. A method for producing electrically conductive zinc oxide as claimed in claim 1 wherein the solid carbon is uniformly dispersed in the mixture.

5. A method for producing electrically conductive zinc oxide as claimed in claim 1 wherein the solid carbon is placed in a layer in the vessel and the mixture is thereupon placed in a layer.

6. A method for producing electrically conductive zinc oxide as claimed in claim 1 wherein the solid carbon is portionwise placed in a layer of the mixture.

7. A method for producing electrically conductive zinc oxide as claimed in claim 1 wherein the solid carbon wrapped in a porous container is placed in a layer of the mixture.

8. A method for producing electrically conductive zinc oxide as claimed in claim 1 wherein the solid carbon is charcoal or coal in the form of powder, granule or lump.

* * * * *